UNITED STATES PATENT OFFICE.

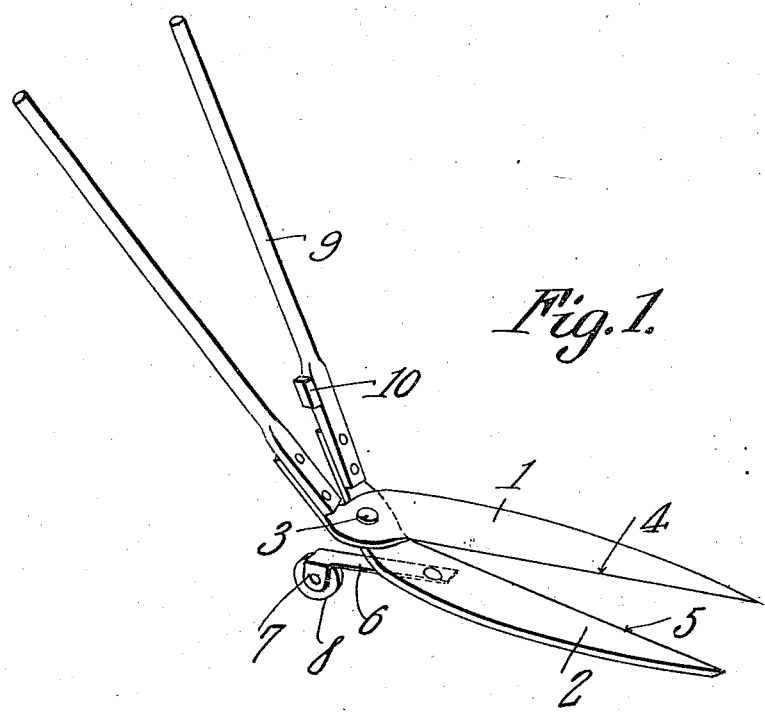
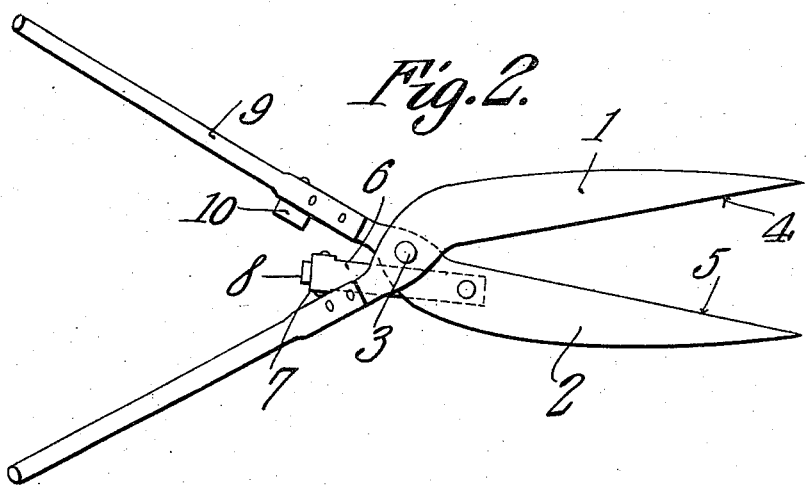

ANDREW J. JOHNSON, OF PAXTON, ILLINOIS, ASSIGNOR OF ONE-HALF TO THE E. M. KRAMER COMPANY, OF PAXTON, ILLINOIS.

EDGE-TRIMMER.

965,192.  Specification of Letters Patent.  Patented July 26, 1910.

Application filed November 5, 1909. Serial No. 526,446.

*To all whom it may concern:*

Be it known that I, ANDREW J. JOHNSON, a citizen of the United States, residing at Paxton, in the county of Ford and State of Illinois, have invented a new and useful Edge-Trimmer, of which the following is a specification.

This invention has relation to edge trimmers and it consists in a novel construction and arrangement of its parts as hereinafter shown and described.

The object of the invention is to provide a simple and effective trimmer adapted to be used for operating upon the edges of lawns in the vicinity of walks or beds and with this object in view the trimmer includes a pair of shearing knives pivoted together and each provided with a handle. Each knife is provided with a cutting edge which is located radially with relation to the pivot point that secures the knives together. A spring bracket is adapted to act as a support for the edge trimmer as an entirety.

In the accompanying drawing Figure 1 is a perspective view of the edge trimmer. Fig. 2 is a top plan view of the same.

The edge trimmer comprises a knife or blade 1 and a knife or blade 2 the said knives being pivoted together at 3 and having cutting edges 4 and 5 respectively, which are located radially with relation to the pivot point 3 between the said knives. A spring bracket 6 is riveted to the under side of the knife 2 and is provided at its rear end with downwardly disposed parallel lugs 7 between which a roller 8 is journaled. The said roller 8 and the bracket 6 are adapted to serve as a support for the edge trimmer as an entirety. Handles 9 are secured to the shank ends of the blades 1 and 2 and are pitched at obtuse angles to the portions of the said blades lying in advance of the pivot 3. One of the handles 9 is provided upon its inner side with a buffer 10 which may be of rubber or other similar resilient material.

In using the implement for the purpose of trimming the edge of the lawn adjacent to walks, the roller 8 is passed along the edge of the walk adjacent the edge of the lawn and as above indicated serves as a support for the trimmer. At the same time the operator swings the upper ends of the handles 9 toward each other which causes the cutting blade edges 4 and 5 of the blades 1 and 2 to approach and move away from each other and consequently the blades of grass which project over the walk beyond the edge of the lawn are trimmed. The buffer 10 prevents the free ends of the handles 9 from approaching too close to each other thus protecting the knuckles of the operator and at the same time breaks the force of impact between the handles 9 during the cutting operation as described.

Having thus described my invention what I claim as new and desire to secure by Letters-Patent is:

1. A trimmer comprising blades pivoted together, handles attached to the shanks of the blades, a resilient bracket fixed to one of the blades and a roller journaled in said bracket.

2. A trimmer comprising blades pivoted together, handles attached to the shanks of the blades, a bracket consisting of a resilient strip secured at one end to one of the blades and having at its rear end parallel lugs and a roller journaled for rotation between said lugs.

In testimony that I claim the foregoing as my own, I have hereto affixed my signature in the presence of two witnesses.

ANDREW J. JOHNSON.

Witnesses:
C. E. BEACH,
V. E. JOHNSON.